(12) United States Patent
Koike

(10) Patent No.: US 11,085,508 B2
(45) Date of Patent: Aug. 10, 2021

(54) DRIVING APPARATUS

(71) Applicant: MINEBEA MITSUMI Inc., Nagano (JP)

(72) Inventor: Shinji Koike, Saitama (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/640,554

(22) PCT Filed: Jul. 20, 2018

(86) PCT No.: PCT/JP2018/027376
§ 371 (c)(1),
(2) Date: Feb. 20, 2020

(87) PCT Pub. No.: WO2019/044263
PCT Pub. Date: Mar. 7, 2019

(65) Prior Publication Data
US 2020/0370622 A1 Nov. 26, 2020

(30) Foreign Application Priority Data
Aug. 28, 2017 (JP) .............................. JP2017-163694

(51) Int. Cl.
F16H 1/28 (2006.01)
A47K 13/10 (2006.01)
(Continued)

(52) U.S. Cl.
CPC .............. *F16H 1/28* (2013.01); *A47K 13/10* (2013.01); *F16H 35/10* (2013.01);
(Continued)

(58) Field of Classification Search
CPC ................................. F16H 1/28; F16H 35/10
See application file for complete search history.

(56) References Cited

U.S. PATENT DOCUMENTS 7,293,297 B2 * 11/2007 Hayashi ................. A47K 13/10
4/246.1
2015/0051039 A1 * 2/2015 Keeney ................... F16H 35/10
475/149

FOREIGN PATENT DOCUMENTS

CN         1703160 A       11/2005
JP        63-125844 A       5/1988
(Continued)

OTHER PUBLICATIONS

Chinese Office Action dated Aug. 17, 2020 for corresponding Chinese Application No. 201880000915.9 and English translation.
(Continued)

*Primary Examiner* — Derek D Knight
(74) *Attorney, Agent, or Firm* — Pearne & Gordon LLP

(57) ABSTRACT

Provided is a driving apparatus that can be miniaturized while maintaining necessary output. A driving apparatus (1) comprises a motor (10), an intermediate gear train (20) including at least one gear that transmits power generated by the motor (10), and an output shaft (30) to output driving power to outside. Furthermore, the driving apparatus (1) comprises a torque limiter (40) provided between the intermediate gear train (20) and the output shaft (30), to enable cutoff of the transmission of the power between the intermediate gear train (20) and the output shaft (30), and a planetary gear mechanism (50) provided between the torque limiter (40) and the output shaft (30). The planetary gear mechanism (50) is disposed in parallel with the motor (10).

13 Claims, 9 Drawing Sheets

(51) Int. Cl.
  *F16H 35/10* (2006.01)
  *F16H 1/32* (2006.01)
  *F16H 37/04* (2006.01)
  *F16H 57/02* (2012.01)

(52) U.S. Cl.
  CPC .. *F16H 2001/327* (2013.01); *F16H 2037/048* (2013.01); *F16H 2057/02086* (2013.01)

(56) References Cited

FOREIGN PATENT DOCUMENTS

| JP | 2004-104902 A | 4/2004 |
|----|---------------|--------|
| JP | 2008-095322 A | 4/2008 |
| JP | 2011-052788 A | 3/2011 |
| JP | 2014-194248 A | 10/2014 |
| JP | 2014194248 A * | 10/2014 |
| JP | 2017-020568 A | 1/2017 |

OTHER PUBLICATIONS

International Search Report for corresponding International Application No. PCT/JP2018/027376 dated Oct. 23, 2018.
Written Opinion for corresponding International Application No. PCT/JP2018/027376 dated Oct. 23, 2018.
Notice of Reasons for Refusal dated Apr. 21, 2020 for corresponding Japanese Application No. 2017-163694 and English translation.
English translation of the Written Opinion for corresponding International Application No. PCT/JP2018/027376 dated Oct. 23, 2018.
International Preliminary Report on Patentability for corresponding International Application No. PCT/JP2018/027376 dated Mar. 3, 2020.

* cited by examiner

DRIVING APPARATUS

TECHNICAL FIELD

The present invention relates to a driving apparatus, and particularly relates to a driving apparatus including a torque limiter.

BACKGROUND ART

Heretofore, a driving apparatus has been used in an opening/closing apparatus that opens and closes a lid or the like, and such a driving apparatus has been used, for example, as a driving apparatus that opens and closes a toilet seat or a toilet lid. This driving apparatus is provided with a torque limiter that cuts off transmission of torque, when a user manually opens and closes the toilet seat or the toilet lid to apply the torque (overload) having a predetermined value or more to the driving apparatus via the toilet seat or the toilet lid, so that a gear or a motor of the driving apparatus is protected. In such a driving apparatus, power of the motor is transmitted to an output shaft via an intermediate gear train including a plurality of gears or the like, and the overload can be cut off by the torque limiter provided in a transmission path of this power (e.g., see Patent Literature 1).

DOCUMENT LIST

Patent Literature

Patent Literature 1: Japanese Patent Application Publication No. 2017-20568

SUMMARY OF INVENTION

Technical Problem

In an opening/closing apparatus, reduction of attaching space of a driving apparatus has heretofore been desired, and further miniaturization has been required for a conventional driving apparatus. On the other hand, the driving apparatus has to generate sufficient output for rotating a toilet seat, a toilet lid or the like. Thus, the conventional driving apparatus is required to have a structure that is capable of achieving miniaturization while maintaining necessary output.

The present invention has been developed in view of the above described problem, and it is an object of the present invention is to provide a driving apparatus that can be miniaturized while maintaining necessary output.

Solution to Problem

To achieve the above object, a driving apparatus according to the present invention is characterized by comprising a motor; an intermediate gear train including at least one gear that transmits power generated by the motor; an output shaft to output driving power to outside; a torque limiter provided between the intermediate gear train and the output shaft, to enable cutoff of transmission of the power between the intermediate gear train and the output shaft; and a planetary gear mechanism provided between the torque limiter and the output shaft, wherein the planetary gear mechanism is disposed in parallel with the motor.

In the driving apparatus according to an aspect of the present invention, the output shaft, the planetary gear mechanism, and the torque limiter are arranged in series.

In the driving apparatus according to an aspect of the present invention, the planetary gear mechanism includes an internal gear member that is a member including a through hole in which an internal gear is formed, and the internal gear member is fixed in the driving apparatus.

The driving apparatus according to an aspect of the present invention further comprises a case that stores the motor, the intermediate gear train, the torque limiter and the planetary gear mechanism, and the internal gear member forms a part of the case.

In the driving apparatus according to an aspect of the present invention, the internal gear member is separate from the case.

In the driving apparatus according to an aspect of the present invention, the internal gear member is a flat plate member having a pair of faces arranged back to back with each other in an extending direction of the through hole.

In the driving apparatus according to an aspect of the present invention, the internal gear member is integral with the case.

In the driving apparatus according to an aspect of the present invention, a central axis of the planetary gear mechanism is parallel to a central axis of the motor.

The driving apparatus according to an aspect of the present invention further comprises a potentiometer including a detecting gear to detect a position of the output shaft in a rotation direction, and the output shaft includes a detecting gear engagement gear that engages with the detecting gear.

In the driving apparatus according to an aspect of the present invention, the detecting gear is disposed between the output shaft and the motor.

In the driving apparatus according to an aspect of the present invention, a plurality of planetary gears of the planetary gear mechanism are held on the output shaft, and a sun gear of the planetary gear mechanism is provided on an output side of the torque limiter.

In the driving apparatus according to an aspect of the present invention, the intermediate gear train includes an intermediate gear train output gear on a side of the output shaft, and the torque limiter is stored in the intermediate gear train output gear.

In the driving apparatus according to an aspect of the present invention, the output shaft extends toward a side opposite to a motor output shaft that is an output shaft of the motor.

In the driving apparatus according to an aspect of the present invention, the torque limiter includes a plurality of friction plates superimposed on one another, at least one disc spring, and an output side member, and each of the friction plates is disposed between the output side member and one gear of the intermediate gear train in a pressed state by the disc spring.

Effects of Invention

According to a driving apparatus of the present invention, miniaturization can be achieved while maintaining necessary output.

DESCRIPTION OF EMBODIMENTS

Hereinafter, embodiments of the present invention will be described with reference to drawings.

Figure 1A:
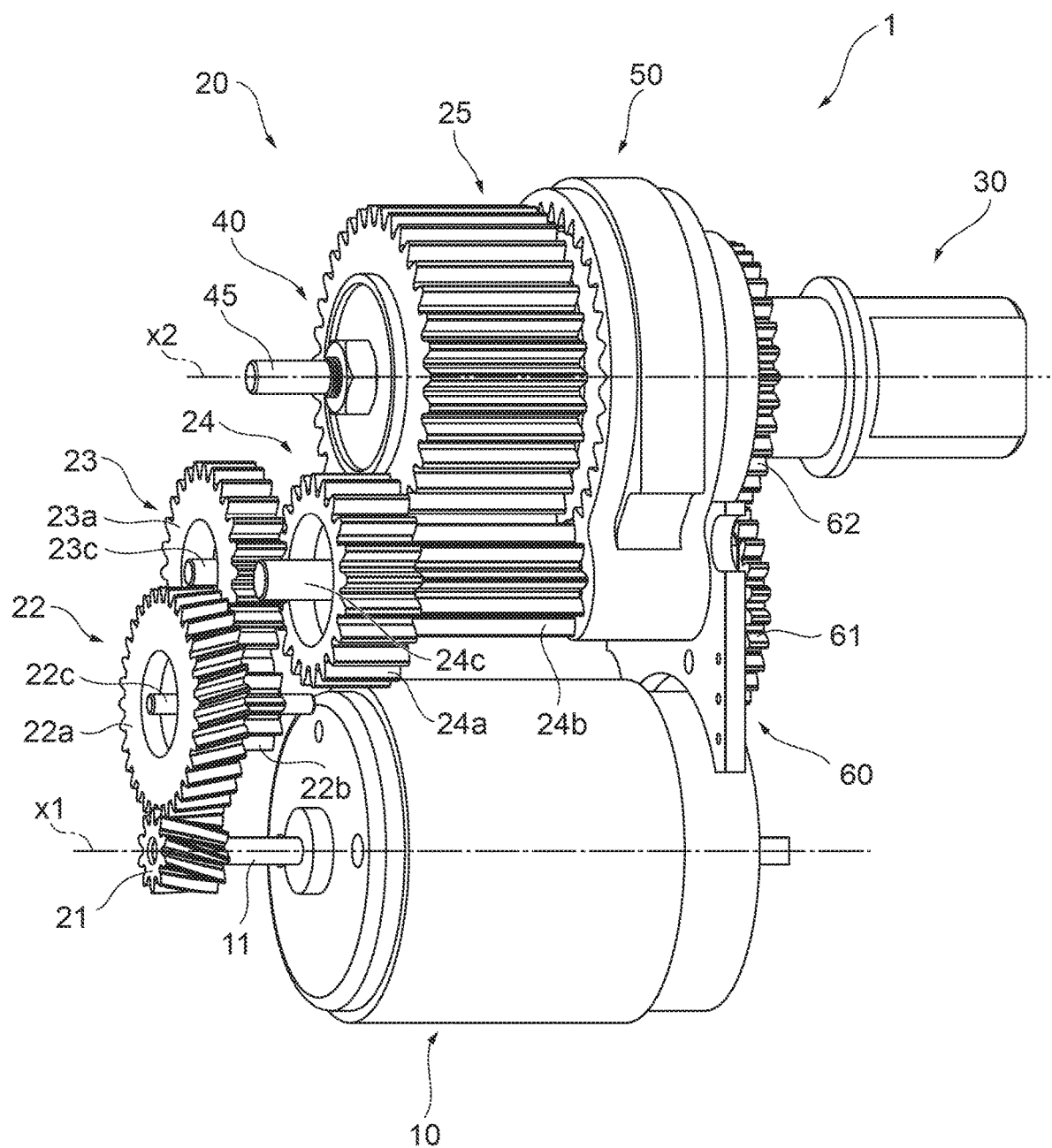
FIG. 1A A perspective view schematically showing a configuration of a driving apparatus in a state where a case is omitted from the driving apparatus according to an embodiment of the present invention.
Figure 1B:
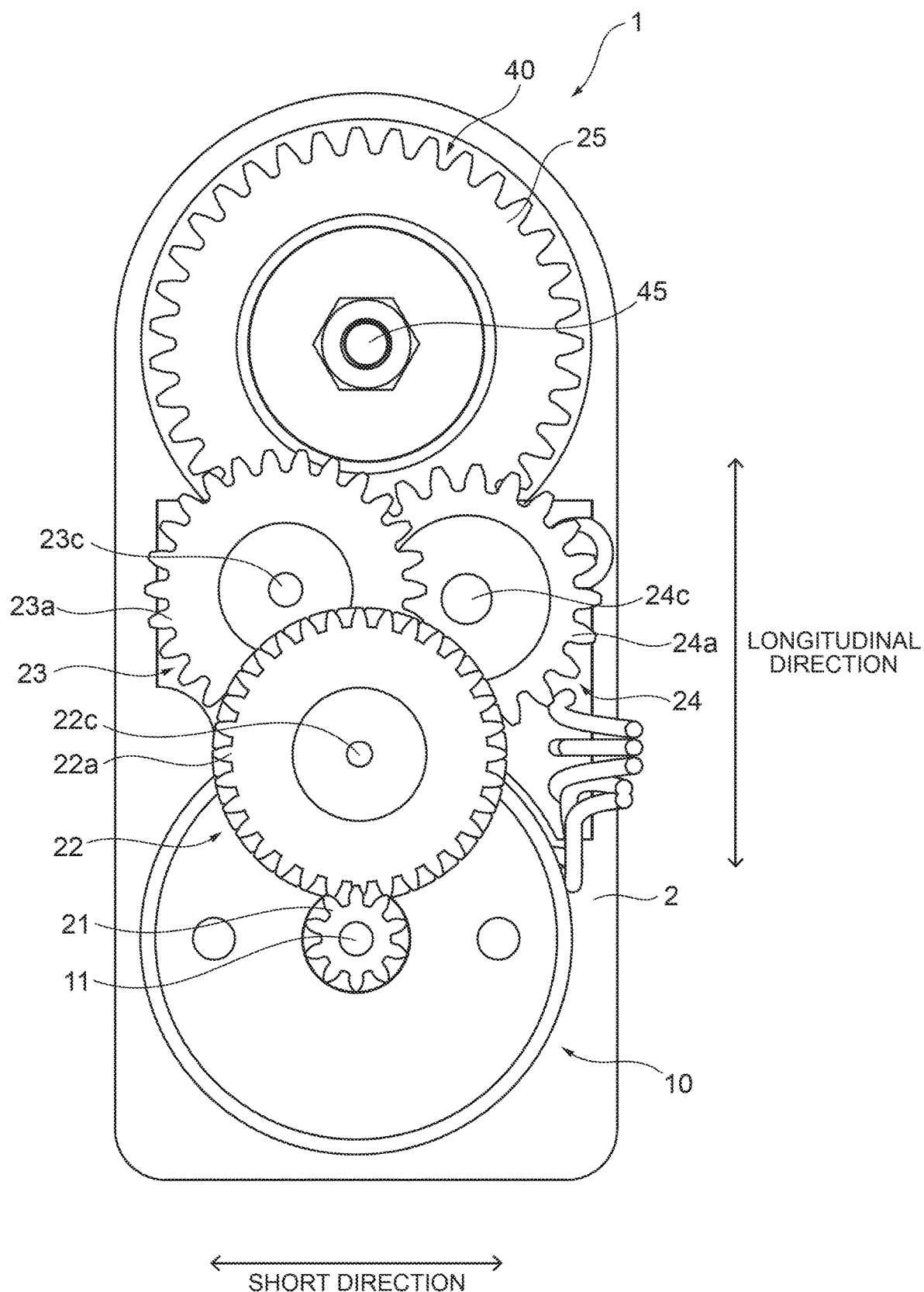
FIG. 1B A rear view schematically showing the configuration of the driving apparatus in the state where the case is omitted from the driving apparatus according to the embodiment of the present invention.
Figure 2:
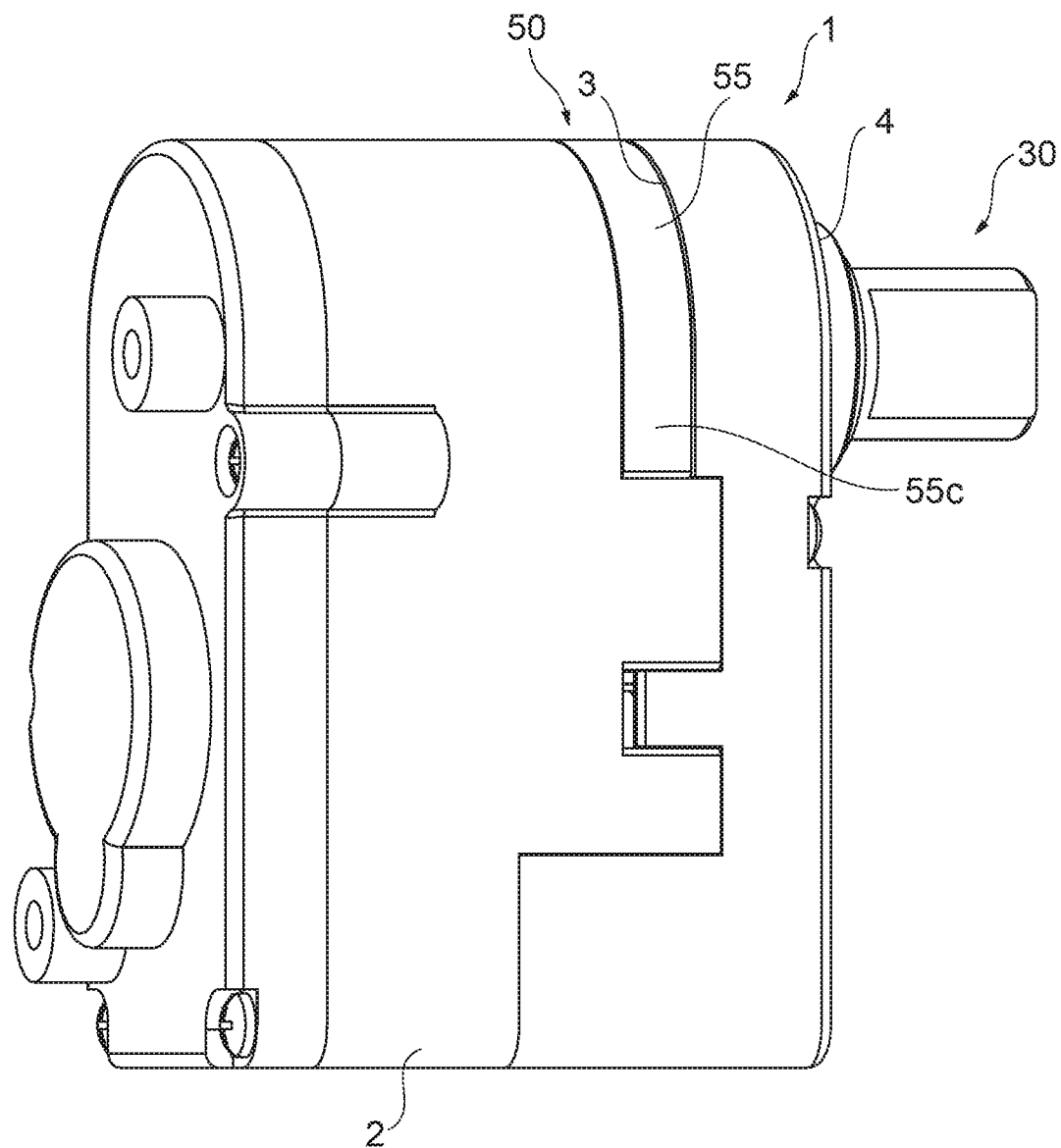
FIG. 2 A perspective view schematically showing an appearance of the driving apparatus according to the embodiment of the present invention.

FIG. 1A is a perspective view schematically showing a configuration of a driving apparatus 1 according to the embodiment of the present invention. FIG. 1B is a rear view of the driving apparatus 1. In FIGS. 1A, B, a case 2 is omitted. Furthermore, FIG. 2 is a perspective view schematically showing an appearance of the driving apparatus 1. As shown in FIG. 1A and FIG. 2, the driving apparatus 1 according to the embodiment of the present invention comprises a motor 10, an intermediate gear train 20 including at least one gear that transmits power generated by the motor 10, and an output shaft 30 to output driving power to outside. Furthermore, the driving apparatus 1 comprises a torque limiter 40 provided between the intermediate gear train 20 and the output shaft 30, to enable cutoff of the transmission of the power between the intermediate gear train 20 and the output shaft 30, and a planetary gear mechanism 50 provided between the torque limiter 40 and the output shaft 30. The planetary gear mechanism 50 is disposed in parallel with the motor 10. Hereinafter, the configuration of the driving apparatus 1 will be specifically described. Hereinafter, for convenience of description, in the driving apparatus 1, it is considered that a side of an output side of the motor 10 is an input side, and a side of an output side of the output shaft 30 is an output side.

As shown in FIG. 1A, the motor 10 includes a motor output shaft 11 as an output shaft. A driving signal or electricity is supplied to the motor 10 via an unshown lead wire, and by this driving signal or electricity, the motor output shaft 11 of the motor 10 rotates. As the motor 10, for example, a stepping motor, a DC motor, a DC brushless motor or the like can be used. The motor 10 may be an AC motor.

As described above, the intermediate gear train 20 includes the at least one gear to transmit an output of the motor 10, and includes, for example, a worm gear 21 attached to the motor output shaft 11, one or more intermediate gears, and an intermediate gear train output gear 25 as shown in FIG. 1A. In the present embodiment, the intermediate gear train 20 includes four intermediate gears 22 to 24. The intermediate gear train 20 does not have to include any intermediate gears. The worm gear 21 is a helical gear fixed to a tip of the motor output shaft 11. The intermediate gears 22 to 24 have similar shapes, respectively, and the gear having a large diameter and the gear having a small diameter are coaxially arranged in an axial direction, so that a rotational speed can be reduced. The intermediate gear train output gear 25 is a gear located on the output side in the intermediate gear train 20.

A large diameter gear 22a of the intermediate gear 22 is a helical gear that meshes with the worm gear 21. There is provided a small diameter gear 22b of the intermediate gear 22 that is disposed coaxially with the large diameter gear 22a in the axial direction and formed integrally with the large diameter gear. The small diameter gear 22b is a spur gear meshed with a large diameter gear 23a of the intermediate gear 23. The intermediate gear 22 is rotatably held on a rotary shaft 22c, and the rotary shaft 22c is held in the driving apparatus 1. The rotary shaft 22c is fixed to, for example, an interior of the after-mentioned case 2 at one end, for example, one end on the input side. The rotary shaft 22c of the intermediate gear 22 and the motor output shaft 11 extend in parallel with each other. Furthermore, the intermediate gear 22 is provided at the same or about the same position as a position of the worm gear 21 in a direction of a motor axis x1 of the motor output shaft 11.

The large diameter gear 23a of the intermediate gear 23 is a spur gear that meshes with the small diameter gear 22b of the intermediate gear 22. There is provided a small diameter gear 23b of the intermediate gear 23 that is disposed coaxially with the large diameter gear 23a in the axial direction and formed integrally with the large diameter gear. The small diameter gear 23b is a spur gear meshed with a large diameter gear 24a of the intermediate gear 24. The intermediate gear 23 is rotatably held on a rotary shaft 23c, and the rotary shaft 23c is held in the driving apparatus 1. The rotary shaft 23c is fixed to, for example, the interior of the after-mentioned case 2 at one end, for example, the one end on the input side. The rotary shaft 23c of the intermediate gear 23 and the rotary shaft 22c of the intermediate gear 22 extend in parallel with each other. Furthermore, the intermediate gear 23 is provided at the same or about the same position as a position of the small diameter gear 22b of the intermediate gear 22 in the motor axis x1 direction.

The large diameter gear 24a of the intermediate gear 24 is a spur gear that engages with the small diameter gear 23b of the intermediate gear 23. There is provided a small diameter gear 24b of the intermediate gear 24 that is disposed coaxially with the large diameter gear 24a in the axial direction and formed integrally with the large diameter gear 24a. The small diameter gear 24b is a spur gear meshed with the intermediate gear train output gear 25. The intermediate gear 24 is rotatably held on a rotary shaft 24c, and the rotary shaft 24c is held in the driving apparatus 1. The rotary shaft 24c is fixed to, for example, the interior of the after-mentioned case 2 at one end, for example, the one end on the input side. The rotary shaft 24c of the intermediate gear 24 and the rotary shaft 23c of the intermediate gear 23 extend in parallel with each other. Furthermore, the intermediate gear 24 is provided at the same or about the same position as a position of the small diameter gear 23b of the intermediate gear 23 in the motor axis x1 direction.

As shown in FIG. 1B, when seen from a rear side of the driving apparatus 1 (the input side in the motor axis x1 direction), the intermediate gears 22 to 24 include the large diameter gears 22a to 24a superimposed on one another in the motor axis x1 direction, and the motor 10 and the large diameter gear 22a are superimposed on each other in the motor axis x1 direction. Thus, the motor 10 and the intermediate gears 22 to 24 fit approximately within a region of a width of the motor 10 (a size in a direction orthogonal to the motor axis x1) in a short direction, and also fit in a small region in a longitudinal direction. Consequently, miniaturization of the driving apparatus 1 is achieved. Note that as shown in FIG. 1B, it is considered in the driving apparatus 1 that a direction intersecting an after-mentioned output axis x2 in the direction orthogonal to the motor axis x1 is the longitudinal direction, and a direction orthogonal to this longitudinal direction is the short direction.

The intermediate gear train output gear 25 is a gear disposed on a most downstream side in a power transmission path of the intermediate gear train 20, and is a spur gear. The intermediate gear train output gear 25 is not a gear of two stages differently from the intermediate gears 22 to 24, and forms a gear of one stage. Furthermore, as described later, the torque limiter 40 is stored in the intermediate gear train output gear 25.

Figure 3:
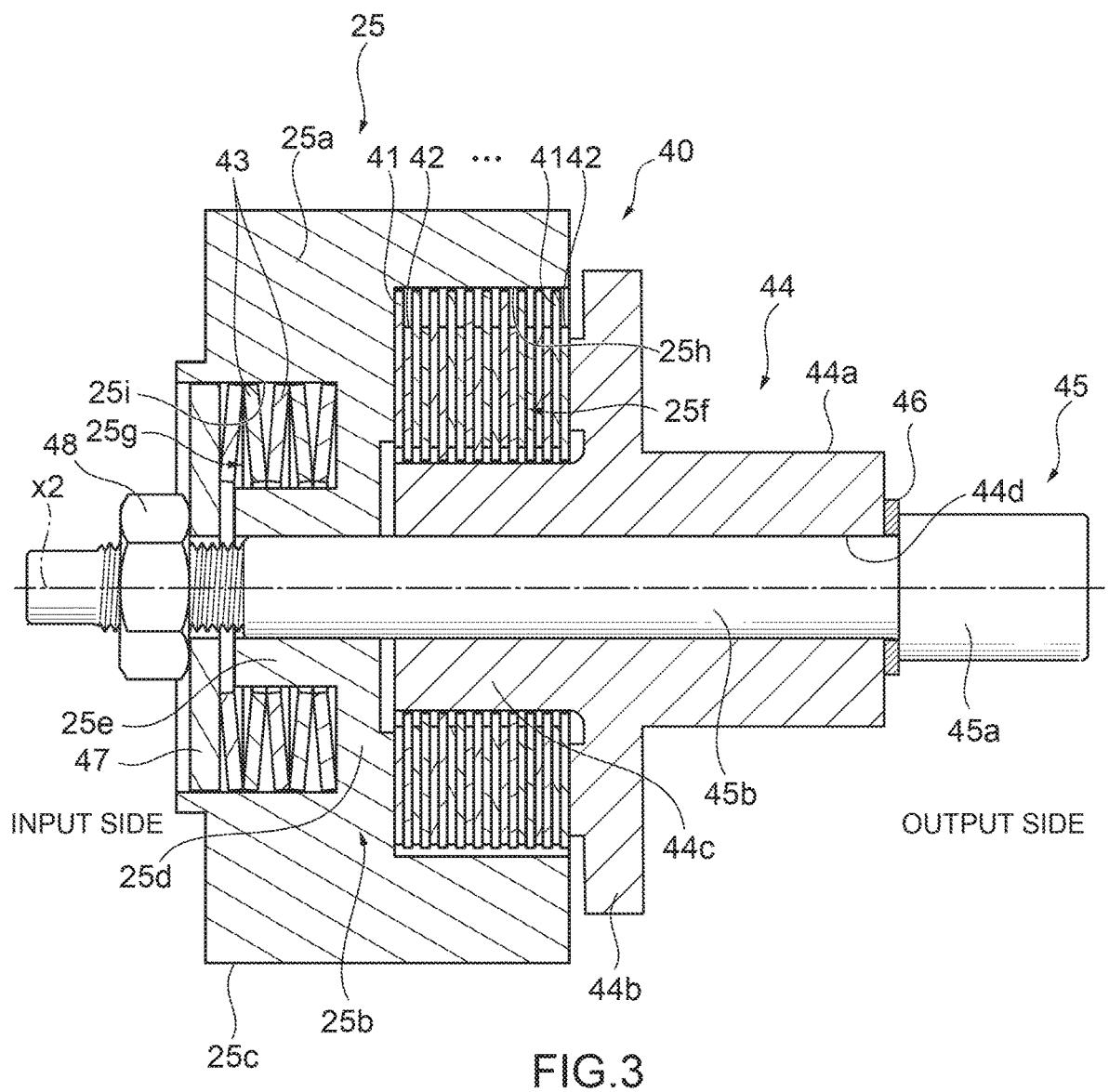
FIG. 3 A sectional view schematically showing configurations of an intermediate gear train output gear and a torque limiter in the driving apparatus according to the embodiment of the present invention.

FIG. 3 is a sectional view schematically showing configurations of the intermediate gear train output gear 25 and the torque limiter 40. As shown in FIG. 3, the intermediate gear train output gear 25 includes a cylindrical portion 25a having a cylindrical shape or an almost cylindrical shape centered or almost centered about the output axis x2, a partition portion 25b formed at a center or an almost center of the cylindrical portion 25a in a direction of the output axis x2, and an output gear portion 25c formed on an outer peripheral surface of the cylindrical portion 25a. The intermediate gear train output gear 25 is formed integrally from the same material, and the cylindrical portion 25a, the partition portion 25b and the output gear portion 25c are respective parts of the integrally formed intermediate gear train output gear 25. The partition portion 25b includes a disc portion 25d having a hollow disc shape or an almost disc shape, and a flange portion 25e having a cylindrical shape or an almost cylindrical shape centered or almost centered about the output axis x2 extending from an end portion of the disc portion 25d on an inner peripheral side toward the input side. The partition portion 25b forms an output side space 25f and an input side space 25g on the output side and the input side in the intermediate gear train output gear 25.

The intermediate gear train output gear 25 is held on a rotary shaft 45 so that the gear is not relatively rotatable, and the rotary shaft 45 is rotatably held in the driving apparatus 1. The rotary shaft 45 has, for example, an end portion on the input side which is held in the after-mentioned case 2. Specifically, the rotary shaft 45 is inserted through a through hole on an inner peripheral side of the flange portion 25e of the partition portion 25b of the intermediate gear train output gear 25, and the intermediate gear train output gear 25 is supported on the rotary shaft 45 so that the gear is not relatively rotatable in the flange portion 25e of the partition portion 25b, and the gear is held movably along the rotary shaft 45 in the output axis x2 direction. As shown in FIG. 1B, when seen from the rear side of the driving apparatus 1, the intermediate gear train output gear 25 fits approximately in the region of the width of the motor 10 in the short direction (the size in the direction orthogonal to the motor axis x1). Furthermore, like the intermediate gears 22 to 24, the intermediate gear train output gear is superimposed on the intermediate gears 23, 24 in the motor output axis x1 direction, and fits within a small region in the longitudinal direction of the driving apparatus 1. Thus, the miniaturization of the driving apparatus 1 is achieved.

As shown in FIG. 3, the torque limiter 40 includes at least a set of a pair of driving side friction plate 41 and driven side friction plate 42 superimposed on each other, and also includes at least one disc spring 43 and an output side member 44. The friction plates 41, 42 are arranged between the output side member 44 and the gear (intermediate gear train output gear) 25 of the intermediate gear train 20 in a pressed state by the disc spring 43. Specifically, the torque limiter 40 has a plurality of sets of pairs of driving side friction plates 41 and driven side friction plates 42, and a plurality of driving side friction plates 41 and driven side friction plates 42 are alternately stored in the output side space 25f formed in the intermediate gear train output gear 25. More specifically, the driving side friction plate 41 is formed of a metal plate (e.g., SUS304), a resin plate or the like, and has an annular shape, and the plates are arranged in parallel in the output axis x2 direction. Furthermore, the driving side friction plate 41 has an end portion on an outer peripheral side which is locked on an inner peripheral surface 25h of the cylindrical portion 25a of the intermediate gear train output gear 25 in the output side space 25f, and the intermediate gear train output gear 25 and the driving side friction plate 41 integrally rotate. Furthermore, the driven side friction plate 42 is formed of a metal plate (e.g., beryllium copper), a resin plate or the like, and has an annular shape, and the plates are arranged in parallel in the output axis x2 direction. Furthermore, the driven side friction plate 42 has an end portion on an inner peripheral side which is locked on a portion of the output side member 44 located in the output side space 25f, and the output side member 44 and the driven side friction plate 42 integrally rotate. The driving side friction plate 41 and the driven side friction plate 42 are free in the output axis x2 direction in the output side space 25f.

The output side member 44 is a tubular member extending along the output axis x2, and includes a cylindrical portion 44a having a cylindrical shape or an almost cylindrical shape, a disc portion 44b that is a flange having a disc shape projecting from an end portion of the cylindrical portion 44a on the input side to the outer peripheral side, and a vertically disposed portion 44c extending from a surface of the disc portion 44b on the input side along the output axis x2 to the input side. In FIG. 3, the disc portion 44b cannot enter the output side space 25f, and an outer diameter of the disc portion 44b may be smaller than a diameter of the inner peripheral surface 25h so that the disc portion 44b can enter the output side space 25f of the intermediate gear train output gear 25. The vertically disposed portion 44c is a tubular member extending along the output axis x2, and has a polygonal contour in a cross section orthogonal to the output axis x2. The vertically disposed portion 44c is inserted into the driven side friction plate 42, and an end portion of the vertically disposed portion 44c on an inner peripheral side engages with an outer peripheral surface of the vertically disposed portion 44c so that the end portion is not rotatable. Furthermore, the rotary shaft 45 is inserted through a through hole 44d formed in the output side member 44, and the output side member 44 is supported rotatably on the rotary shaft 45 and movably along the rotary shaft 45 in the output axis x2 direction. Note that the vertically disposed portion 44c may not have a tubular shape. A plurality of plate members extending from the disc portion 44b may be arranged and formed at an equal angular interval around the rotary shaft 45.

Furthermore, the output side member 44 is movable to a predetermined position along the rotary shaft 45 toward the output side. Specifically, as described above, the rotary shaft 45 includes a shaft portion 45b having a cylindrical shape or an almost cylindrical shape extending through the intermediate gear train output gear 25 and the output side member 44 to slidably hold these gear and member, and a head portion 45a extending from an end of the shaft portion 45b on the output side. The head portion 45a protrudes from the shaft portion 45b on the outer peripheral side, and forms a step at a predetermined position in an extending direction of the rotary shaft 45. The output side member 44 through which the shaft portion 45b is inserted locks the head portion 45a from the input side, and cannot move from a position at which the member locks the head portion 45a to the output side in the rotary shaft 45. Furthermore, a slide washer 46 may be provided between the output side member 44 and the rotary shaft 45.

The disc spring 43 is stored in the input side space 25g formed in the intermediate gear train output gear 25, and contacts the partition portion 25b of the intermediate gear train output gear 25 from the input side, to press the partition portion 25b on the output side. Specifically, the shaft portion 45b of the rotary shaft 45 is inserted in a through hole of the flange portion 25e inserted in a hollow portion of a plurality of disc springs 43, and the disc spring 43 is pressed onto the partition portion 25b from the input side by a washer 47 fixed to the shaft portion 45b of the rotary shaft 45. The washer 47 has a hollow portion in which the rotary shaft 45 is inserted, and is disposed to face the partition portion 25b from the input side via the disc spring 43 disposed between the washer and the partition portion 25b. Furthermore, the washer 47 is engaged and held with the shaft portion 45b at least from the input side. Specifically, a nut 48 is screwed with a thread portion 45c formed in an end portion of the shaft portion 45b of the rotary shaft 45 on the input side, and the nut 48 contacts the washer 47 from the input side, so that the washer 47 cannot move to the input side from a contact position with the nut 48 in the shaft portion 45b.

The torque limiter 40 has the above described configuration, in which the intermediate gear train output gear 25 and the output side member 44 are arranged between the head portion 45a of the rotary shaft 45 and the nut 48. The driving side friction plates 41 to which the disc springs 43 are fixed in a rotation direction in the output side space 25f of the intermediate gear train output gear 25 via the partition portion 25b of the intermediate gear train output gear 25 are pressed onto the driven side friction plates 42 adjacent on the output side, respectively. The intermediate gear train output gear 25 and the output side member 44 integrally rotate, and the output of the motor 10 transmitted via the intermediate gear train 20 is also transmitted to the output side member 44. Furthermore, when torque in excess of a friction force generated between the driving side friction plate 41 and the driven side friction plate 42 is input into the output side member 44 or the intermediate gear train output gear 25, the driving side friction plate 41 and the driven side friction plate 42 are disengaged. The intermediate gear train output gear 25 or the output side member 44 into which this torque is input idles, and a transmission path of power between the intermediate gear train output gear 25 and the output side member 44 is cut off.

Figure 4:
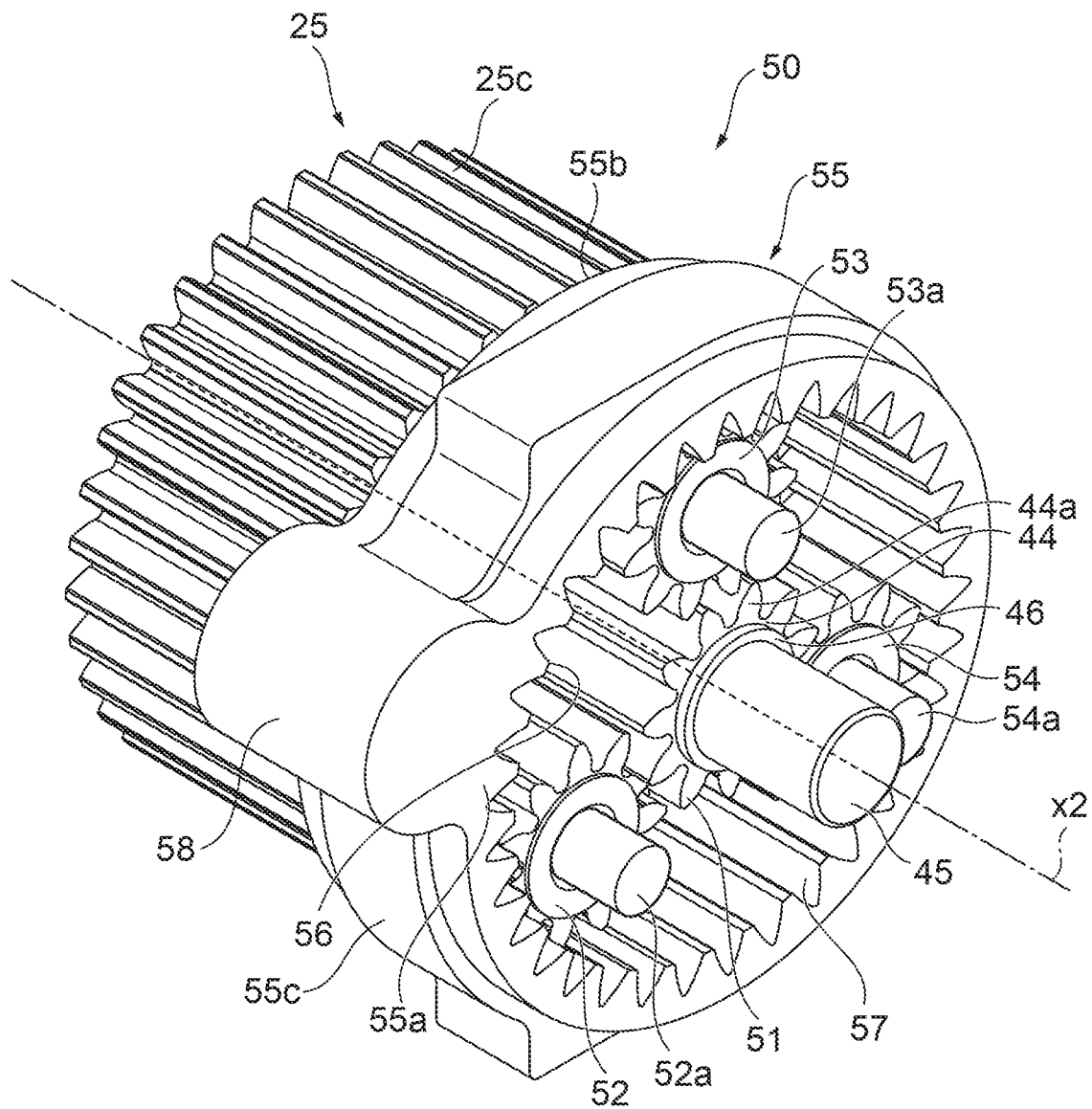
FIG. 4 A perspective view schematically showing a configuration of a planetary gear mechanism in the driving apparatus according to the embodiment of the present invention.
Figure 5:
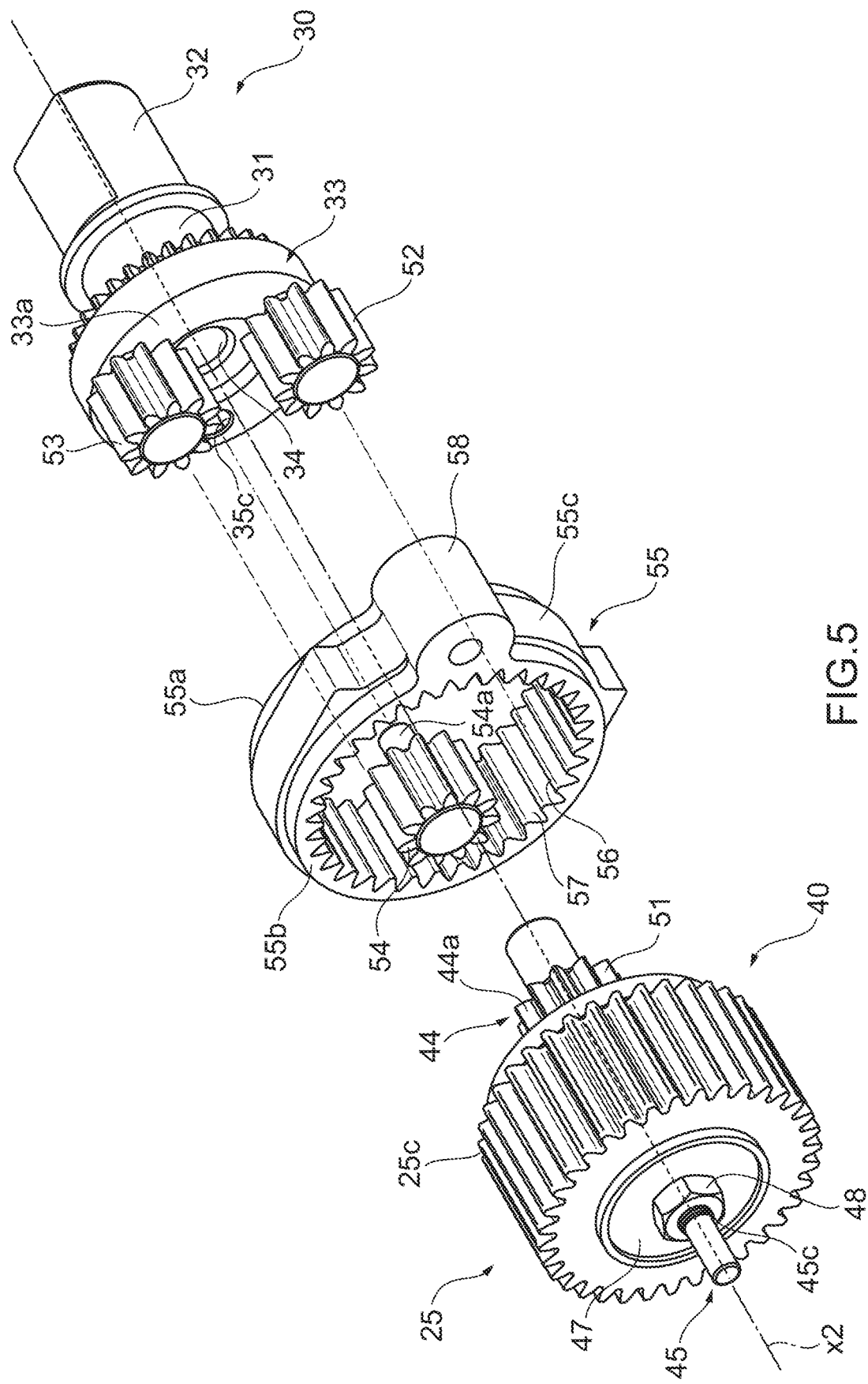
FIG. 5 An exploded perspective view schematically showing the configuration of the planetary gear mechanism in the driving apparatus according to the embodiment of the present invention.
Figure 6:
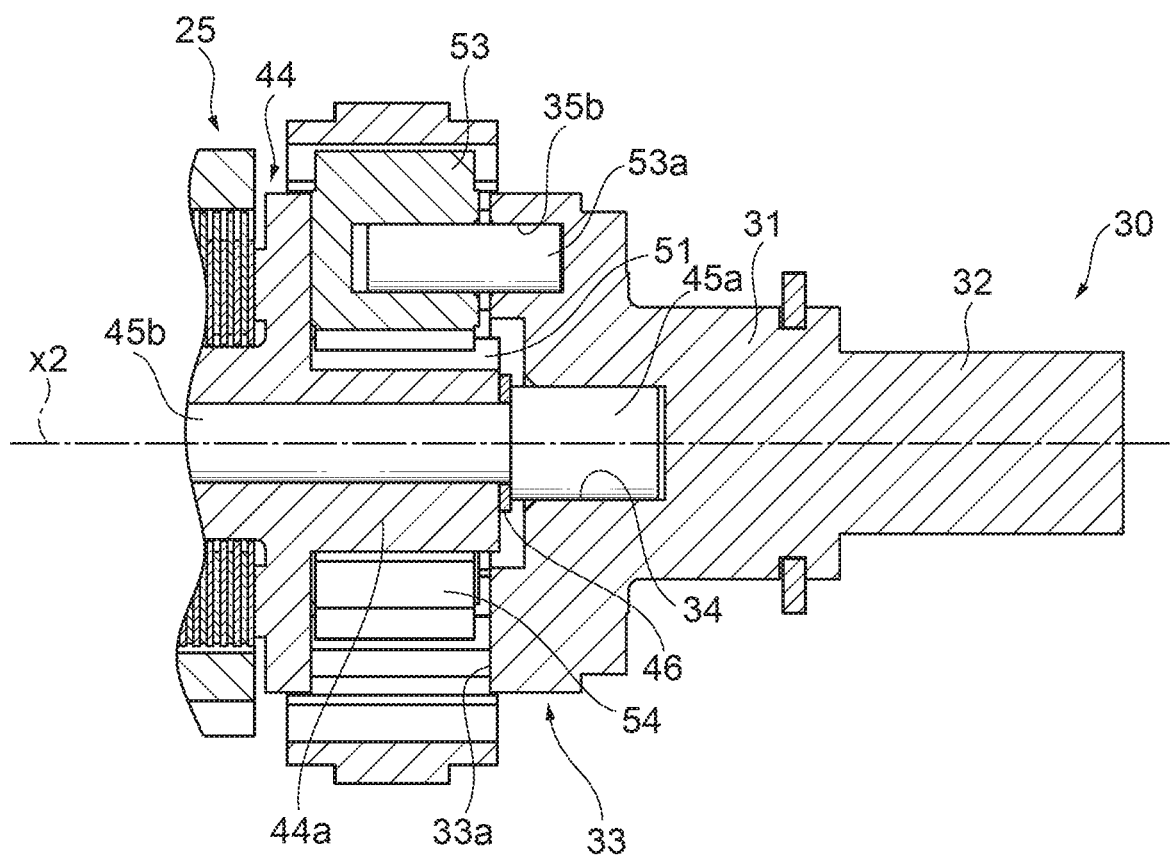
FIG. 6 A sectional view schematically showing the configuration of the planetary gear mechanism in the driving apparatus according to the embodiment of the present invention.

FIG. 4 is a perspective view schematically showing a configuration of the planetary gear mechanism 50 according to the embodiment of the present invention, FIG. 5 is an exploded perspective view schematically showing the configuration of the planetary gear mechanism 50, and FIG. 6 is a sectional view schematically showing the configuration of the planetary gear mechanism 50. As shown in FIG. 4 to FIG. 6, a sun gear 51 of the planetary gear mechanism 50 is formed by the output side member 44 of the torque limiter 40. Specifically, a row of teeth of the sun gear 51 is formed on an outer peripheral surface of the cylindrical portion 44a of the output side member 44, and the sun gear 51 is formed by the cylindrical portion 44a of the output side member 44. Consequently, the rotary shaft 45 serves as the rotary shaft of the torque limiter 40 and the rotary shaft of the planetary gear mechanism 50, and the torque limiter 40 and the planetary gear mechanism 50 are arranged in series in the output axis x2 direction. The sun gear 51 of the planetary gear mechanism 50 is a spur gear.

The planetary gear mechanism 50 includes a plurality of planetary gears that mesh with the sun gear 51, and has, for example, three planetary gears 52 to 54, for example, as shown in FIGS. 4 to 6. The planetary gears 52 to 54 are spur gears. The planetary gears 52 to 54 are rotatably supported on rotary shafts 52a to 54a, respectively, and one end of each of the rotary shafts 52a to 54a is fixed to the output shaft 30.

The planetary gear mechanism 50 includes an internal gear member 55 that is a member including a through hole 57 in which an internal gear 56 is formed, and the internal gear member 55 is fixed in the driving apparatus 1. The internal gear member 55 is formed so that the through hole 57 stores therein the planetary gears 52 to 54 and so that the internal gear 56 meshes with the planetary gears 52 to 54 from the outer peripheral side. Thus, the planetary gear mechanism 50 is a planetary gear mechanism of planetary type. Specifically, the internal gear member 55 is a flat plate member having a pair of faces arranged back to back with each other in an extending direction of the through hole 57. More specifically, the through hole 57 of the internal gear member 55 extends along the output axis x2, and the internal gear member 55 has side faces 55a, 55b that are flat faces or almost flat faces arranged back to back with each other and extending orthogonally or almost orthogonally to the output axis x2. Furthermore, the internal gear member 55 includes a boss portion 58 to fix the internal gear member 55 to another member on the outer peripheral surface 55c connecting the side faces 55a, 55b on the outer peripheral side. The internal gear 56 is an internal gear including spur teeth that mesh with three planetary gears 52 to 54.

As shown in FIG. 6, the sun gear 51, the planetary gears 52 to 54 and the internal gear 56 of the planetary gear mechanism 50 occupy a region (between the side faces 55a and 55b) within a region of a width of the internal gear member 55 in the output axis x2 direction, and are miniaturized in the output axis x2 direction. Furthermore, as shown in FIG. 1A, the rotary shaft 45 of the planetary gear mechanism 50 and the motor output shaft 11 extend in parallel with each other, and the planetary gear mechanism 50 and the motor 10 are provided at the same or about the same position in the motor axis x1 (output axis x2) direction. The planetary gear mechanism 50 is disposed in parallel with the motor 10.

Figure 7:
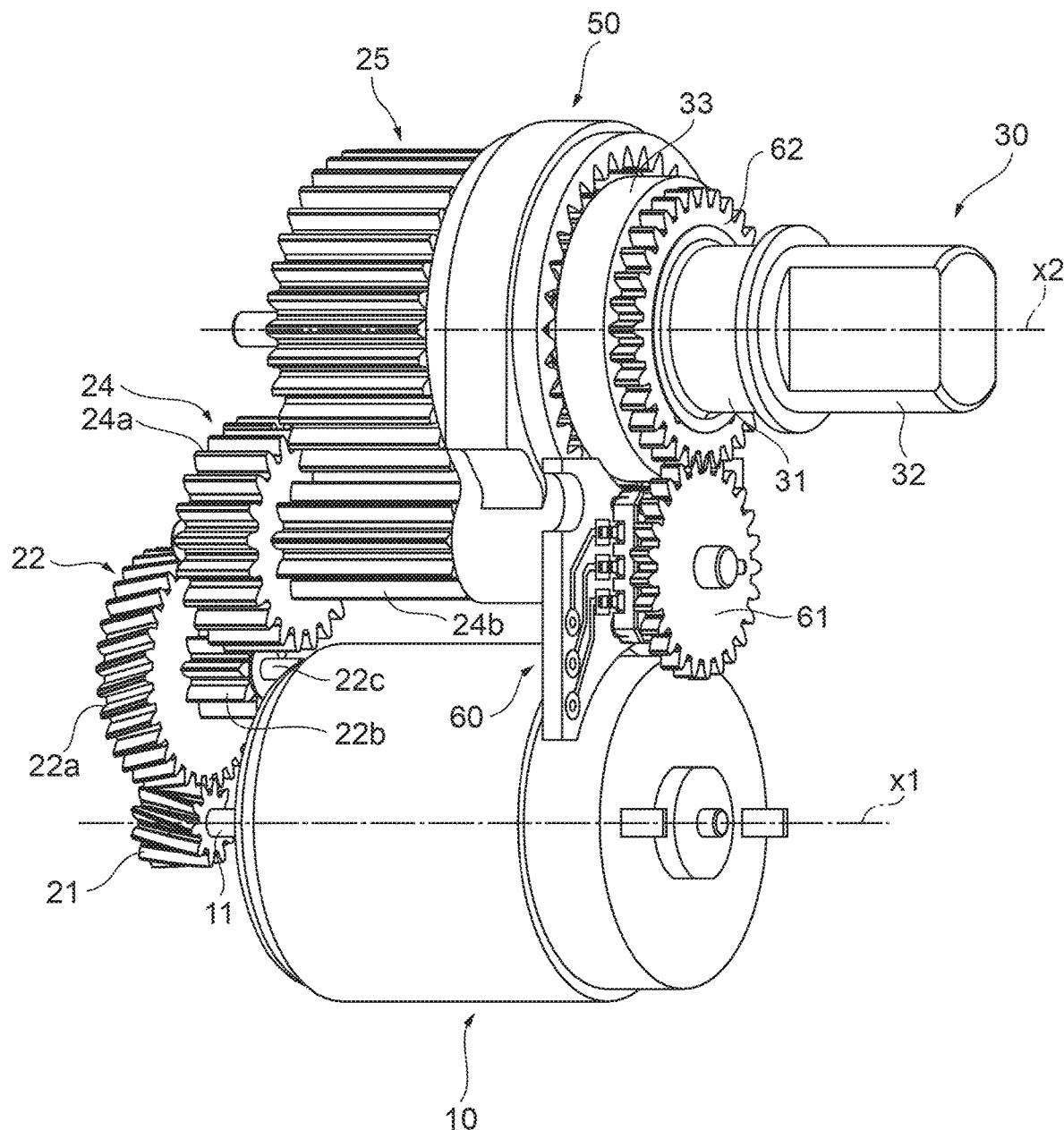
FIG. 7 Another perspective view of the driving apparatus in the state shown in FIG. 1.

The output shaft 30 is a shaft to output the power of the motor 10 transmitted via the intermediate gear train 20, the torque limiter 40 and the planetary gear mechanism 50 as the driving power to the outside of the driving apparatus 1, and the shaft has an end portion on the output side which projects outward from the case 2 as shown in FIG. 2. As shown in FIGS. 5 to 7, the output shaft 30 is a member extending along the output axis x2, and includes a base portion 31 having an almost tubular shape, and an outer output portion 32 extending from the output side of the base portion 31.

On a planetary gear mechanism 50 side (the input side) of the base portion 31, a disc portion 33 that is a flange having a disc shape is provided. Furthermore, as shown in FIG. 5 and FIG. 6, the base portion 31 is formed with a support portion 34 extending inward from a face of the disc portion 33 on the planetary gear mechanism 50 side (an input side face 33a) to form a space having a columnar or almost columnar shape along the output axis x2. The support portion 34 is provided to store the end portion of the rotary shaft 45 of the planetary gear mechanism 50 on the input side and to support the rotary shaft 45. Additionally, the input side face 33a of the disc portion 33 is provided with support portions 35a to 35c to support the rotary shafts 52a to 54a of the planetary gears 52 to 54 of the planetary gear mechanism 50. For example, as shown in FIG. 5, the support portions 35a to 35c are recessed parts formed in the input side face 33a, and are formed so that the rotary shafts 52a to 54a can be fitted in the support portions, respectively. The outer output portion 32 of the output shaft 30 is formed attachably to a rotary shaft of a lid or the like to be opened and closed in an opening/closing apparatus in which the driving apparatus 1 is for use.

Furthermore, as shown in FIG. 1 and FIG. 7, the driving apparatus 1 comprises a potentiometer 60 including a detecting gear 61 to detect a position of the output shaft 30 in the rotation direction. Additionally, the output shaft 30 includes a detecting gear engagement gear 62 that engages with the detecting gear 61. Specifically, the potentiometer 60 is provided between the output shaft 30 and the motor 10, and the detecting gear engagement gear 62 is provided on an outer output portion 32 side of the disc portion 33 in the base portion 31. The detecting gear 61 is meshed with the detecting gear engagement gear 62 between the output shaft 30 and the motor 10. The detecting gear 61 and the detecting gear engagement gear 62 are spur gears.

As described above, the rotary shaft 45 of the planetary gear mechanism 50 and the output shaft 30 are present on the same axis (the output axis x2), and the planetary gear mechanism 50 and the output shaft 30 are arranged in series. Furthermore, an extending direction of the output shaft 30 (a direction from the input side toward the output side in the output axis x2 direction) and an extending direction of the motor output shaft 11 (a direction toward the output side in the motor output axis x1 direction) are opposite to each other. Thus, in the driving apparatus 1, a transmission path of the power over the motor 10, the intermediate gear train 20, the torque limiter 40, the planetary gear mechanism 50 and the output shaft 30 has an almost U-shape. Furthermore, the output shaft 30, the planetary gear mechanism 50 and the torque limiter 40 are arranged in series along the output axis x2. Consequently, the driving apparatus 1 is miniaturized.

As shown in FIG. 2, in the driving apparatus 1, the motor 10, the intermediate gear train 20, the torque limiter 40, the planetary gear mechanism 50 and the potentiometer 60 are stored in the case 2. Furthermore, a part of the outer peripheral surface 55c of the internal gear member 55 fits in an opening 3 formed in the case 2 and is flush with the case 2, and the internal gear member 55 is separate from the case 2, but forms a part of the case 2. Additionally, a side face of the case 2 on the output side is provided with an insertion hole 4 that is a through hole through which the output shaft 30 is to be inserted, and the output shaft 30 projects from the insertion hole 4.

Figure 8:
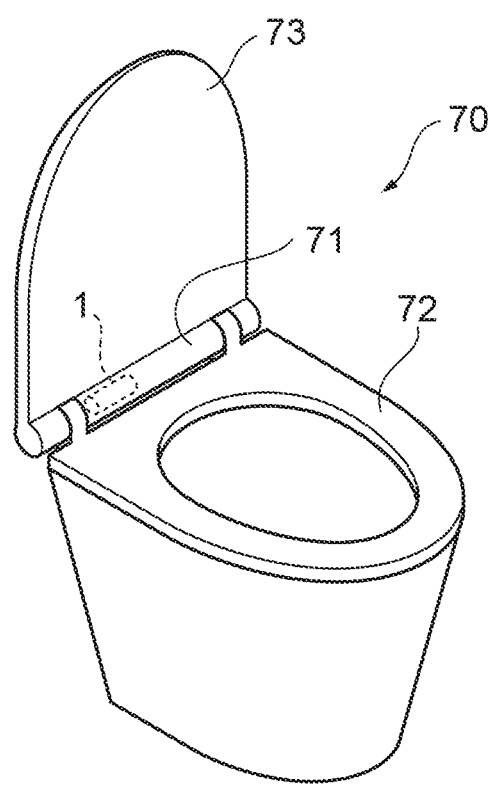
FIG. 8 A perspective view schematically showing a configuration of a toilet bowl with an electric toilet seat that is an example where the driving apparatus according to the embodiment of the present invention is for use.

Next, description will be made as to an operation of the driving apparatus 1 having the above described configuration. FIG. 8 is a perspective view schematically showing a configuration of a toilet bowl 70 with an electric toilet seat that is an example where the driving apparatus 1 is for use. As shown in FIG. 8, the driving apparatus 1 is disposed in a casing 71 of the toilet bowl 70 with the electric toilet seat, and drives to open and close a toilet seat 72 or a lid 73.

When an opening operation of the toilet seat 72 and/or the lid 73 (hereinafter referred to as the lid or the like) is instructed by a predetermined operation in the toilet bowl 70 with the electric toilet seat, in the driving apparatus 1, the motor 10 receives a driving signal of the opening/closing apparatus to bring the lid or the like into an open state, and the motor 10 rotates in a direction to bring the lid or the like into the open state. Upon the rotation of the motor 10, the worm gear 21, the intermediate gear 22, the intermediate gear 23, the intermediate gear 24 and the intermediate gear train output gear 25 rotate in order. Upon the rotation of the intermediate gear train output gear 25, the driving side friction plate 41 also rotates, which is fixed to the intermediate gear train output gear 25 so that the plate is not rotatable. A rotational force of the driving side friction plate 41 is transmitted to the driven side friction plate 42 by a static friction force generated between the driving side friction plate 41 and the driven side friction plate 42, and the driven side friction plate 42 rotates. Upon the rotation of the driven side friction plate 42, the output side member 44 rotates, to which the driven side friction plate 42 is fixed so that the plate is not rotatable. Upon the rotation of the output side member 44, the sun gear 51 rotates together with the output side member 44, the planetary gears 52 to 54 rotate, and the planetary gears 52 to 54 revolve in the internal gear 56. Upon the revolution of the planetary gears 52 to 54, the output shaft 30 rotates. Consequently, power generated by the motor 10 is transmitted as the driving power from the output shaft 30 to an unshown rotary shaft of the lid or the like of the toilet bowl 70 with the electric toilet seat, this rotary shaft rotates, and the lid or the like opens.

Furthermore, in the driving apparatus 1, when the motor 10 receives the driving signal to bring the lid or the like into a closed state, the motor 10 rotates in a direction to bring the lid or the like into the closed state, and the power of the motor 10 is transmitted to the output shaft 30 via the worm gear 21, the intermediate gear train 20, the torque limiter 40, and the planetary gear mechanism 50 in the same manner as in the above described opening operation of the lid or the like. Then, the power generated by the motor 10 is transmitted as the driving power from the output shaft 30 to the unshown rotary shaft of the lid or the like of the toilet bowl 70 with the electric toilet seat, this rotary shaft rotates, and the lid or the like closes.

On the other hand, in the toilet bowl 70 with the electric toilet seat, when a user performs a manual operation of manually bringing the toilet seat 72 or the lid 73 into the open state or the closed state to apply a load to the rotary shaft of the toilet seat 72 or the lid 73, this rotary shaft rotates in an opening direction or a closing direction. Upon the rotation of this rotary shaft, the rotational force is transmitted to the output side member 44 via the output shaft 30 and the planetary gear mechanism 50. In a case where torque to be transmitted to the output side member 44 based on the manual operation of the toilet seat 72 or the lid 73 is more than a maximum static friction force between the driving side friction plate 41 and the driven side friction plate 42, the driven side friction plate 42 slips against the driving side friction plate 41. The torque applied to the output side member 44 is not transmitted to the intermediate gear train output gear via the driving side friction plate 41 and the driven side friction plate 42, and the transmission of the torque based on the user's manual operation is cut off by the torque limiter 40. This can prevent members such as the worm gear 21, the intermediate gear train 20, the torque limiter 40, the planetary gear mechanism 50 and the output shaft 30 from being broken due to the transmission of the torque based on the user's manual operation to the worm gear 21.

In the driving apparatus 1, the planetary gear mechanism 50 is provided between the torque limiter 40 and the output shaft 30, and the planetary gear mechanism 50 is disposed in parallel with the motor 10, so that space saving of the mechanism between the torque limiter 40 and the output shaft 30 can be achieved. Furthermore, the rotary shaft 45 of the planetary gear mechanism 50 is parallel to the motor output shaft 11, so that the driving apparatus 1 can be miniaturized much more. Furthermore, the torque limiter 40 can be disposed at a position close to the output shaft 30. Consequently, the transmission path of the power of the torque limiter 40 can be cut off closer to the output side, and an internal structure of the driving apparatus 1 can be protected.

Furthermore, the output shaft 30, the planetary gear mechanism 50 and the torque limiter 40 are arranged in series, so that the driving apparatus 1 can be further miniaturized in the output axis x2 direction. Furthermore, each mechanism of the planetary gear mechanism 50 is stored within the width of the flat internal gear member 55 (the width in the output axis x2 direction), and the internal gear member 55 is fixed in the driving apparatus 1, so that the driving apparatus 1 can be further miniaturized. Additionally, the planetary gear mechanism 50 of planetary type is used. Even if the transmission path of the power of the motor 10 is miniaturized, drop in the torque to be transmitted can be inhibited.

Additionally, the internal gear member 55 that forms a part of the case 2 is separate from the case 2, and hence, the internal gear member 55 can be different from the case 2 in material. Consequently, the material of the internal gear member 55 can be a member suitable for the gear. An example of the material of the case 2 is a resin containing glass, and an example of the material of the internal gear member 55 is a resin that is resistant to friction. Furthermore, the rotary shaft 45 of the planetary gear mechanism 50 is parallel to the motor output shaft 11. Consequently, much more space in the driving apparatus 1 can be saved, and the driving apparatus 1 can be further miniaturized.

Furthermore, the detecting gear 61 of the potentiometer 60 including the detecting gear 61 to detect the position of the output shaft 30 in the rotation direction meshes with the detecting gear engagement gear 62 provided on the output shaft 30. The detecting gear 61 can be directly engaged with the output shaft 30, and the position of the output shaft 30 can be detected with high accuracy. Additionally, the detecting gear 61 is disposed between the output shaft 30 and the motor 10, so that the driving apparatus 1 can be further miniaturized.

Additionally, the torque limiter 40 is stored in the intermediate gear train output gear 25, so that the driving apparatus 1 can be further miniaturized in the output axis x2 direction. Furthermore, the output shaft 30 extends toward a side opposite to the motor output shaft 11. Consequently, a plurality of gears can be provided in the output axis x2 direction, and the driving apparatus 1 can be further miniaturized in the output axis x2 direction.

The embodiment of the present invention has been described above, but the present invention is not limited to the above embodiment of the present invention, and includes all aspects included in concept and claims of the present invention. Furthermore, the respective configurations can be suitably selectively combined to produce at least parts of the above described objects and effects. For example, the shape, material, arrangement, size and the like of each component in the above embodiment can be suitably changed in accordance with a specific usage mode of the present invention.

For example, the embodiment of the present invention has been described as to an example of the driving apparatus 1 where the toilet bowl 70 with the electric toilet seat opens and closes the toilet seat 72 or the lid 73. However, a lid of another apparatus may be opened and closed. A position of the driving apparatus 1 in an application target of the driving apparatus 1 may be suitably changed, and a plurality of driving apparatuses 1 may be provided. For example, the driving apparatus 1 is applicable not only to the toilet bowl with the electric toilet seat but also to a laptop personal computer that opens and closes a display, a container such as a garbage box that opens and closes a lid, and an opening/closing apparatus of a washing machine or the like that opens and closes a door or the like.

Furthermore, the embodiment of the present invention has been described as to an example of the driving apparatus 1 in a case where the internal gear member 55 is formed as a separate member in a part of the case 2. However, the internal gear member 55 may be integral with the case 2. If the internal gear member 55 and the case 2 are integrally formed, the internal gear member 55 does not have to be provided as the separate member, and a number of components of the driving apparatus 1 can be reduced.

LIST OF REFERENCE SIGNS 1 driving apparatus,
2 case,
3 opening,
4 insertion hole,
10 motor,
11 motor output shaft,
20 intermediate gear train,
21 worm gear,
22 to 24 intermediate gear,
22$a$ to 24$a$ large diameter gear,
22$b$ to 24$b$ small diameter gear,
22$c$ to 24$c$ rotary shaft,
25 intermediate gear train output gear,
25$a$ cylindrical portion,
25$b$ partition portion,
25$c$ output gear portion,
25$d$ disc portion,
25$e$ flange portion,
25$f$ output side space,
25$g$ input side space,
25$h$ and 25$i$ inner peripheral surface,
30 output shaft,
31 base portion,
32 outer output portion,
33 disc portion,
33$a$ input side face,
34 support portion, 35a to 35c support portion,
40 torque limiter,
41 driving side friction plate,
42 driven side friction plate,
43 disc spring,
44 output side member,
44a cylindrical portion,
44b disc portion,
44c vertically disposed portion,
44d through hole,
45 rotary shaft,
45a head portion,
45b shaft portion,
45c thread portion,
46 slide washer,
47 washer,
48 nut,
50 planetary gear mechanism,
51 sun gear,
52 to 54 planetary gear,
52a to 54a rotary shaft,
55 internal gear member,
55a and 55b side face,
55c outer peripheral surface,
56 internal gear,
57 through hole,
58 boss portion,
60 potentiometer,
61 detecting gear,
62 detecting gear engagement gear,
70 toilet bowl with electric toilet seat,
71 casing,
72 toilet seat,
73 lid,
x1 motor axis, and
x2 output axis.

The invention claimed is:

1. A driving apparatus comprising:
a motor;
an intermediate gear train including at least one gear that transmits power generated by the motor;
an output shaft to output driving power to outside;
a torque limiter provided between the intermediate gear train and the output shaft, to enable cutoff of transmission of the power between the intermediate gear train and the output shaft; and
a planetary gear mechanism provided between the torque limiter and the output shaft,
wherein the planetary gear mechanism is disposed in parallel with the motor,
wherein the intermediate gear train includes an intermediate gear train output gear on a side of the output shaft, and the torque limiter is stored in the intermediate gear train output gear.

2. The driving apparatus according to claim 1, wherein the output shaft, the planetary gear mechanism, and the torque limiter are arranged in series.

3. The driving apparatus according to claim 1, wherein the planetary gear mechanism includes an internal gear member that is a member including a through hole in which an internal gear is formed, and the internal gear member is fixed in the driving apparatus.

4. The driving apparatus according to claim 3, further comprising a case that stores the motor, the intermediate gear train, the torque limiter, and the planetary gear mechanism, wherein the internal gear member forms a part of the case.

5. The driving apparatus according to claim 4, wherein the internal gear member is separate from the case.

6. The driving apparatus according to claim 5, wherein the internal gear member is a flat plate member having a pair of faces arranged back to back with each other in an extending direction of the through hole.

7. The driving apparatus according to claim 4, wherein a peripheral surface of the internal gear member is flush with the case.

8. The driving apparatus according to claim 1, wherein a central axis of the planetary gear mechanism is parallel to a central axis of the motor.

9. The driving apparatus according to claim 1, further comprising a potentiometer including a detecting gear to detect a position of the output shaft in a rotation direction, wherein the output shaft includes a detecting gear engagement gear that engages with the detecting gear.

10. The driving apparatus according to claim 9, wherein the detecting gear is disposed between the output shaft and the motor.

11. The driving apparatus according to claim 1, wherein a plurality of planetary gears of the planetary gear mechanism are held on the output shaft, and a sun gear of the planetary gear mechanism is provided on an output side of the torque limiter.

12. The driving apparatus according to claim 1, wherein the output shaft extends toward a side opposite to a motor output shaft that is an output shaft of the motor.

13. A driving apparatus comprising:
a motor;
an intermediate gear train including at least one gear that transmits power generated by the motor;
an output shaft to output driving power to outside;
a torque limiter provided between the intermediate gear train and the output shaft, to enable cutoff of transmission of the power between the intermediate gear train and the output shaft; and
a planetary gear mechanism provided between the torque limiter and the output shaft, wherein the planetary gear mechanism is disposed in parallel with the motor,
wherein the torque limiter includes a plurality of friction plates superimposed on one another, at least one disc spring, and an output side member, and each of the friction plates is disposed between the output side member and one gear of the intermediate gear train in a pressed state by the disc spring.

* * * * *